US010025671B2

(12) United States Patent
Bryant et al.

(10) Patent No.: US 10,025,671 B2
(45) Date of Patent: Jul. 17, 2018

(54) SMART VIRTUAL MACHINE SNAPSHOTTING

(71) Applicant: International Business Machines Corporation, Armonk, NY (US)

(72) Inventors: Jay S. Bryant, Rochester, MN (US); James E. Carey, Rochester, MN (US); Zachary A. Hill, Muskegon, MI (US); Kendall J. Nelson, St. Paul, MN (US); Lucas A. Palm, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 15/230,940

(22) Filed: Aug. 8, 2016

(65) Prior Publication Data

US 2018/0039548 A1 Feb. 8, 2018

(51) Int. Cl.
G06F 11/07 (2006.01)
G06F 11/14 (2006.01)

(52) U.S. Cl.
CPC ........ *G06F 11/1451* (2013.01); *G06F 11/079* (2013.01); *G06F 11/0709* (2013.01); *G06F 11/0712* (2013.01); *G06F 11/0751* (2013.01); *G06F 11/0787* (2013.01); *G06F 11/1464* (2013.01); *G06F 11/1469* (2013.01); *G06F 2201/805* (2013.01); *G06F 2201/815* (2013.01); *G06F 2201/84* (2013.01); *G06F 2201/85* (2013.01)

(58) Field of Classification Search
CPC .......................... G06F 11/0709; G06F 11/1451

USPC ...................................................... 714/15, 20
See application file for complete search history.

(56) References Cited

U.S. PATENT DOCUMENTS

| | | | |
|---|---|---|---|
| 8,055,951 B2 | 11/2011 | Ben-Yehuda et al. | |
| 9,201,887 B1 | 12/2015 | Earl et al. | |
| 2002/0183971 A1* | 12/2002 | Wegerich | G05B 23/0254 702/185 |
| 2007/0101202 A1* | 5/2007 | Garbow | G06F 11/008 714/47.2 |
| 2007/0219673 A1* | 9/2007 | Wang | G06F 13/409 701/1 |
| 2013/0159790 A1* | 6/2013 | Iikura | G06F 11/0751 714/48 |
| 2013/0268491 A1* | 10/2013 | Chung | G06F 17/30174 707/634 |
| 2014/0122931 A1* | 5/2014 | Devale | G06F 11/34 714/37 |
| 2014/0215279 A1* | 7/2014 | Houseman | G06F 11/2268 714/47.3 |
| 2014/0298113 A1* | 10/2014 | Sakurai | G06F 11/2025 714/47.3 |

(Continued)

*Primary Examiner* — Chae M Ko
(74) *Attorney, Agent, or Firm* — Brown & Michaels, PC; David Woycechowsky

(57) ABSTRACT

Determining a time for on-demand snapshotting of a virtual machine in a node prior to a failure point in a system comprising a plurality of nodes. Failure data is collected from a set of failed nodes of the plurality of nodes in a system. A failure pattern of the node is identified based on the failure data and monitoring the plurality of nodes for the failure pattern to determine that a first node of the plurality of nodes is exhibiting the failure pattern. Responsive to the determination that the first node is exhibiting the failure pattern, capturing a snapshot of a virtual machine corresponding to the first node.

17 Claims, 3 Drawing Sheets

(56) References Cited

U.S. PATENT DOCUMENTS

| | | | |
|---|---|---|---|
| 2014/0361978 A1* | 12/2014 | Malarky | G06F 11/3058 345/156 |
| 2015/0082098 A1 | 3/2015 | Anand | |
| 2015/0234716 A1* | 8/2015 | Brooker | G06F 11/1458 714/47.1 |
| 2015/0248341 A1* | 9/2015 | Cabrera | G06F 11/07 714/37 |
| 2015/0323926 A1* | 11/2015 | Wang | G05B 19/0423 700/19 |
| 2016/0098764 A1* | 4/2016 | Musumeci | G06Q 30/0275 705/14.61 |
| 2016/0127307 A1 | 5/2016 | Jain et al. | |

\* cited by examiner

SMART VIRTUAL MACHINE SNAPSHOTTING

BACKGROUND

The present invention relates to virtual machines of a cloud computing environment, and more specifically to smart virtual machine snapshotting.

A virtual machine (VM) snapshot is a "point in time image" of a virtual guest operating system in a cloud computing environment. The snapshot contains enough information about the VM that, in the case of a disk failure, service/application crash, etc., the machine can be successfully rebooted to that last point in time with minimal loss in data. Current implementations of snapshotting technology require an administrator to manually take the snapshots, or set the snapshots to be taken at certain intervals (i.e. every night at 11:00 pm or every 3 hours).

SUMMARY

According to one embodiment of the present invention, a method for use with a system comprising a plurality of nodes. The method comprising the steps of: a computer collecting failure data from a set of failed nodes of the plurality of nodes, wherein the failure data includes information regarding usage and conditions of each given failed node of the set of failed node(s) prior to a failure point of the given failed node comprising static data regarding failure of each given failed node and dynamic data; the computer identifying a failure pattern of the node based on the failure data; the computer monitoring the plurality of nodes for the failure pattern to determine that a first node of the plurality of nodes is exhibiting the failure pattern; and responsive to the determination that the first node is exhibiting the failure pattern, the computer capturing a snapshot of a virtual machine corresponding to the first node.

According to another embodiment of the present invention, a computer program product for use with a system comprising a plurality of nodes. A computer comprising at least one processor, one or more memories, one or more computer readable storage media, the computer program product comprising a computer readable storage medium having program instructions embodied therewith. The program instructions executable by the computer to perform a method comprising: collecting, by the computer, failure data from a set of failed nodes of the plurality of nodes, wherein the failure data includes information regarding usage and conditions of each given failed node of the set of failed nodes(s) prior to a failure point of the given failed node comprising static data regarding failure of each given failed node and dynamic data; identifying, by the computer, a failure pattern of the node based on the failure data; monitoring, by the computer, the plurality of nodes for the failure pattern to determine that a first node of the plurality of nodes is exhibiting the failure pattern; and capturing, by the computer, in response to the determination that the first node is exhibiting the failure pattern, a snapshot of a virtual machine corresponding to the first node.

According to another embodiment of the present invention a computer system for use with a system comprising a plurality of nodes. The computer system comprising a computer comprising at least one processor, one or more memories, one or more computer readable storage media having program instructions executable by the computer to perform the program instructions comprising: collecting, by the computer, failure data from a set of failed nodes of the plurality of nodes, wherein the failure data includes information regarding usage and conditions of each given failed node of the set of failed nodes(s) prior to a failure point of the given failed node comprising static data regarding failure of each given failed node and dynamic data; identifying, by the computer, a failure pattern of the node based on the failure data; monitoring, by the computer, the plurality of nodes for the failure pattern to determine that a first node of the plurality of nodes is exhibiting the failure pattern; and capturing, by the computer, in response to the determination that the first node is exhibiting the failure pattern, a snapshot of a virtual machine corresponding to the first node.

DETAILED DESCRIPTION

Figure 1:
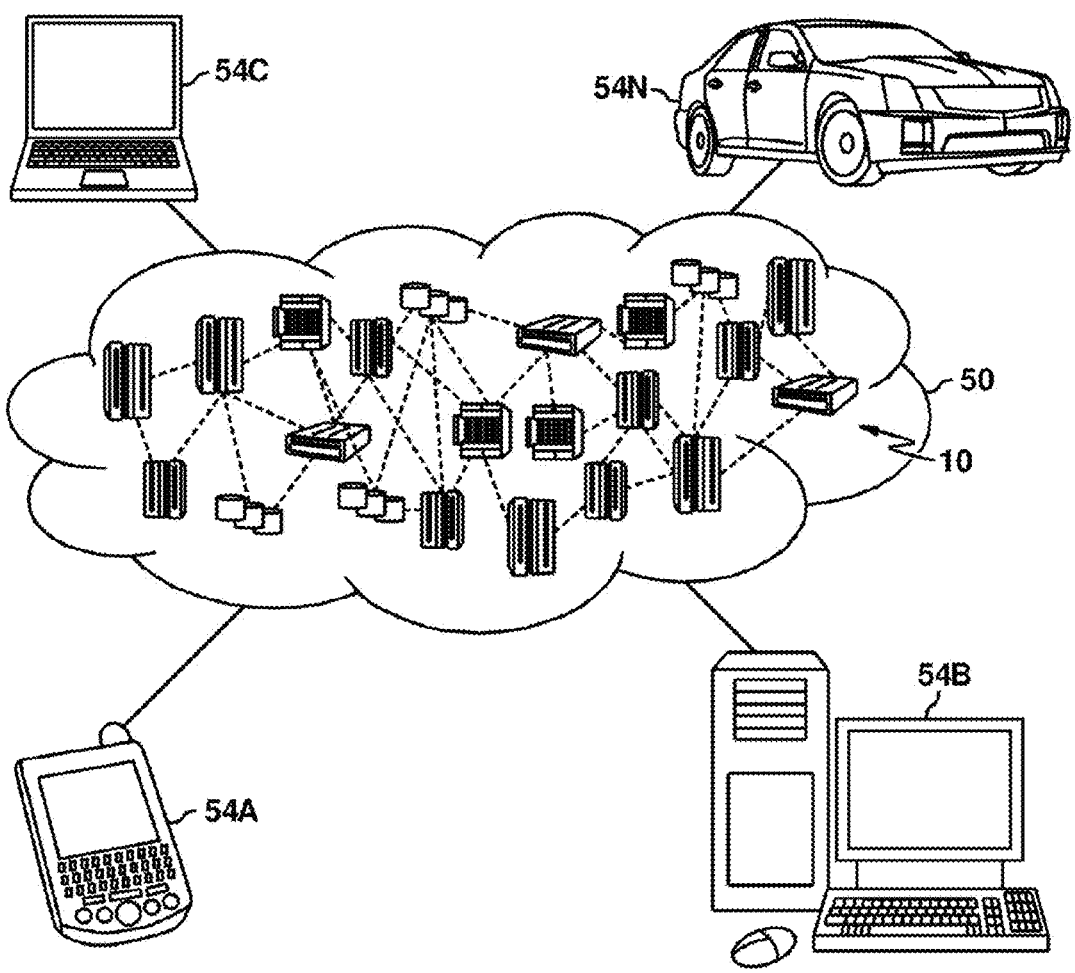
FIG. 1 depicts a cloud computing node according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
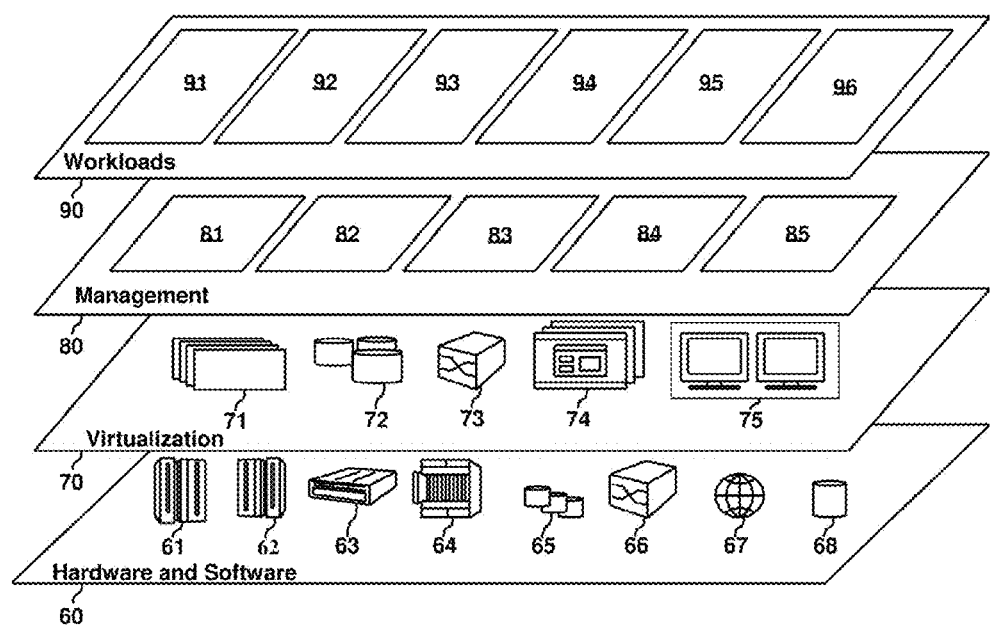
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients or machines 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and failure pattern recognition 96.

In an embodiment of the present invention, it will be recognized that by capturing and analyzing both historical data, including static and dynamic data, and real-time data about VMs, a VM snapshotting system would ensure that snapshots are taken at the best possible time to reduce the risk and minimize the amount of data loss. The reduced data loss can also aid in eliminating much of the system downtime incurred after such a failure occurs, since the system administrators would need less time for recovery.

Figure 3:
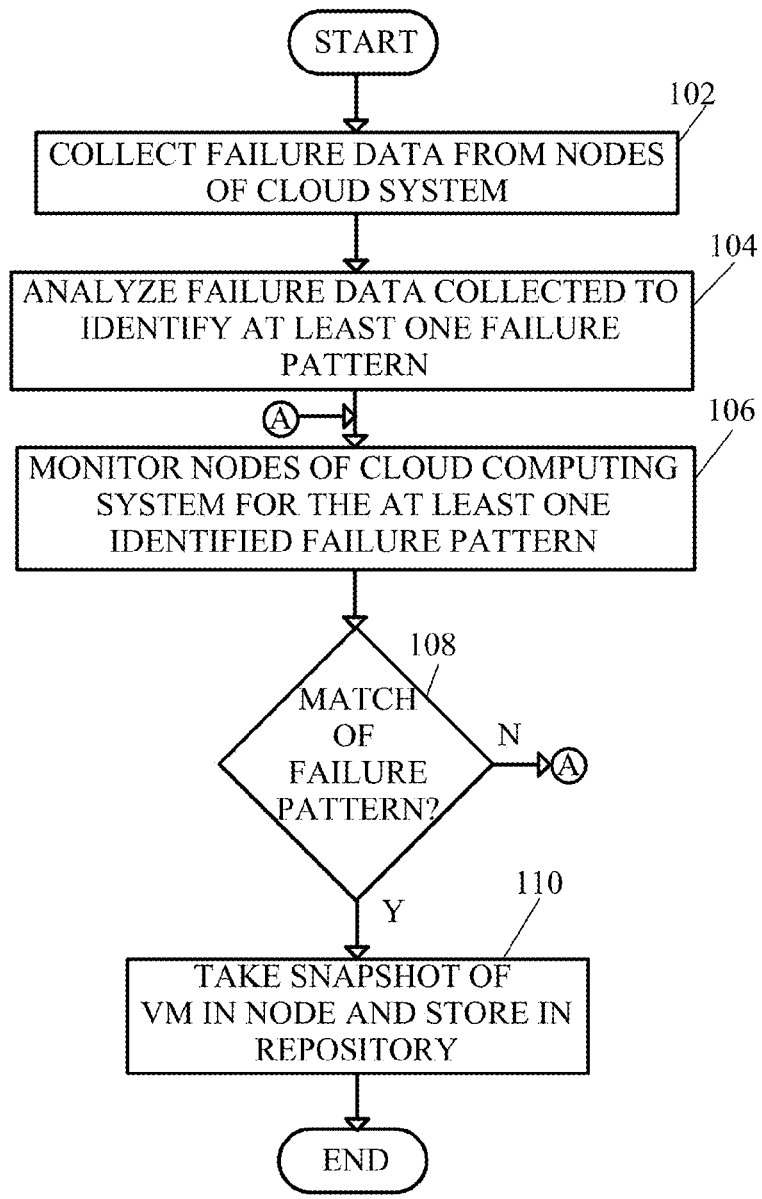
FIG. 3 shows a flow diagram of a method of determining timing for snapshotting a virtual machine.

FIG. 3 shows a flow diagram of a method of determining timing for snapshotting a virtual machine.

In a first step, failure data is collected from nodes of a cloud system and stored in a repository (step 102). Each node 10 has at least one virtual machine (VM), which may be part of the virtualization layer 70.

The failure data, while historical in nature, preferably includes dynamic data collected from failed nodes prior to the failure occurring, due to real time monitoring of the nodes, and static data collected regarding the actual failure at a failure point.

The failure data regarding the VM and other similar VM's, for example VM's running the same type of software applications on similar hardware, is collected and stored in a repository. The failure data preferably reflects previous known points of failure about each node or system of nodes. The failure data may include, but is not limited to: at what date/times the VM has been known to have a general system failure; workload of the VM including, but not limited to central processing unit (CPU), memory, power usage and temperature prior to and at the time of failure; workload of the physical server hosting the VMs prior to and at the time of failure; amount of resources, such as CPU and memory, allotted to the VM; operating system or image type of the VM prior to and at the time of failure; most recent software installations and updates; software library versions; the mean time before failure (MTBF) for the VM or similar VM configurations.

The failure data collected is then analyzed to identify at least one failure pattern (step 104).

The failure pattern preferably includes a combination of static data and dynamic data (e.g. operating system+CPU usage prior to the failure). To identify the at least one failure pattern a pattern or log analysis system may be used. Examples of systems that may be used are Kibana®—a log aggregator/analyzer, Splunk®—a log analyzer and Logmet of Bluemix®—a log collector. The failure pattern or log analysis system may detect combinations of node properties which are repetitive. The combinations or the amount of repetition to be detected may be determined by an administrator. Additionally, the administrator may set how many node properties need to match in multiple data records to be considered a valid failure pattern.

It will also be recognized that in an embodiment of the present invention, as more data is collected and more failure patterns identified, the accuracy of these patterns increases, increasing the accuracy of the timing of the snapshots prior to failure to ensure the highest data security, integrity, and minimal data loss.

For example, if 100 records worth of data have been collected from 100 failed nodes, as collected in step 102, a detection of a failure pattern using a log analysis system is determined by viewing the 100 records. In viewing the 100 records, it is determined that a majority of the nodes, for example 75 nodes, were running Ubuntu 14.04 Operating System at time of failure. Of the 75 nodes running Ubuntu 14.04, thirty of the nodes were found to have been running an older version of the Docker Engine, in particular version 1.7.1. Of the thirty nodes running Docker, twenty-five prior to failure had a memory usage of 50% or more. The specific configuration of a node, for example running Ubuntu 14.04 with Docker Engine version 1.7.1 and displaying dynamic data of memory usage of 50% or more would be logged as a valid failure pattern, as there is a fair amount of nodes that have failed under this configuration.

The nodes of the cloud computing system are monitored in real-time for the at least one identified failure pattern (step 106).

The monitoring of the nodes of the cloud computer system includes tracking the static data of each of the nodes being monitored. The static information may include, but is not limited to: the operating system installed, the amount of resources allocated—such as CPU, memory, network adapters, consoles, libraries, disks attached, hardware architecture and other information. The monitoring of the nodes also includes polling the nodes being monitored for dynamic data, such as current workload information such as CPU, memory usage, hardware temps, current traffic within the system, current usage statistics etc., and program installations. The polling may occur at different intervals as specified by the administrator.

By using real-time data regarding the configuration and performance of the nodes of the cloud computing system, a comprehensive picture of the system in which the node is present is available to determine whether the at least one failure pattern is present at any time and whether an on-demand snapshot of the node should be taken prior to a possible failure.

If a failure pattern is not found in one of the nodes (step 108), the method repeats step 106 of monitoring nodes of the cloud for the at least one failure pattern.

If a failure pattern is found in one of the nodes (step 108), a snapshot of the virtual machines (VMs) in the node is taken and stored in a repository (step 110) and the method ends. The snapshot preferably includes a file-based snapshot of the state, disk data, and configuration of a virtual machine at a specific point in time.

For example, based on the valid failure pattern of running Ubuntu 14.04 with Docker Engine version 1.7.1 and displaying dynamic data of memory usage of 50% or more, a snapshot of the node and the associated VMs would be taken in order to save the data on the VMs prior to failure of the VMs and the node.

Some embodiments of the present invention may include one, or more, of the following operations, features characteristics and/or advantages: (i) collecting failure data from failed nodes of a plurality of nodes in a virtual machine set system, with each node of the plurality of nodes corresponding to a virtual machine; (ii) identifying, by machine logic, a first failure pattern in the failure data, with the first pattern including a static pattern portion and a dynamic pattern portion; (iii) monitoring nodes for patterns by: (a) keeping a record of the static data of each node of the plurality of nodes, and (b) intermittently polling the nodes of the plurality of nodes for dynamic data; (iv) responsive to the monitoring, determining, by machine logic, that a first node of the plurality of nodes matches the first failure pattern; (v) responsive to the determination that the first node matches the first failure pattern, taking a first snapshots of the first node so that the first node's data is safe in case of an actual failure of the first node; and/or (vi) the failure data includes: the current date/time, the workload on the VM (CPU/memory/power usage/temp), the workload of the physical server hosting the VM's, the amount of resources (CPU/memory) that were allocated to the VM, the operating system (image type) of the VM, most recent software installations and updates and/or software library versions.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method for use with a system comprising a plurality of nodes, the method comprising the steps of:
    a computer collecting failure data from a set of failed nodes of the plurality of nodes, wherein the failure data includes information regarding usage and conditions of each given failed node of the set of failed node(s) prior to a failure point of the given failed node comprising static data regarding failure of each given failed node and dynamic data;

the computer identifying a failure pattern of the node based on the failure data;

the computer monitoring the plurality of nodes for the failure pattern to determine that a first node of the plurality of nodes is exhibiting the failure pattern; and responsive to the determination that the first node is exhibiting the failure pattern, the computer capturing a snapshot of a virtual machine corresponding to the first node.

2. The method of claim 1, wherein the plurality of nodes are monitored by the steps comprising:

the computer maintaining a record of the static data of each node of the plurality of nodes being monitored; and the computer intermittently polling each node of the plurality of nodes for dynamic data.

3. The method of claim 1, wherein the failure data consists of: workload of the virtual machine in the node, workload of a server hosting the virtual machines of the node, software installations and updates, and software version.

4. The method of claim 1, wherein the failure pattern comprises: a combination of repetitive node properties shown prior to the failure point, and a combination of repetitive node properties shown at the failure point.

5. The method of claim 1, wherein the static data consists of: operating system installed, libraries, disks attached, and resources allocated.

6. The method of claim 1, wherein the dynamic data consists of: current workload information, current usage statistics, and program installations.

7. A computer program product for use with a system comprising a plurality of nodes, a computer comprising at least one processor, one or more memories, one or more computer readable storage media, the computer program product comprising a computer readable storage medium having program instructions embodied therewith, the program instructions executable by the computer to perform a method comprising:

collecting, by the computer, failure data from a set of failed nodes of the plurality of nodes, wherein the failure data includes information regarding usage and conditions of each given failed node of the set of failed nodes(s) prior to a failure point of the given failed node comprising static data regarding failure of each given failed node and dynamic data;

identifying, by the computer, a failure pattern of the node based on the failure data;

monitoring, by the computer, the plurality of nodes for the failure pattern to determine that a first node of the plurality of nodes is exhibiting the failure pattern; and capturing, by the computer, in response to the determination that the first node is exhibiting the failure pattern, a snapshot of a virtual machine corresponding to the first node.

8. The computer program product of claim 7, wherein the plurality of nodes are monitored through the program instructions of:

maintaining, by the computer, a record of the static data of each node of the plurality of nodes being monitored; and intermittently polling, by the computer, each node of the plurality of nodes for dynamic data.

9. The computer program product of claim 7, wherein the failure data consists of: workload of the virtual machine in the node, workload of a server hosting the virtual machines of the node, software installations and updates, and software version.

10. The computer program product of claim 7, wherein the failure pattern comprises: a combination of repetitive node properties shown prior to the failure point, and a combination of repetitive node properties shown at the failure point.

11. The computer program product of claim 7, the static data consists of: operating system installed, libraries, disks attached, and resources allocated.

12. The computer program product of claim 7, wherein the dynamic data consists of: current workload information, current usage statistics, and program installations.

13. A computer system for use with a system comprising a plurality of nodes, the computer system comprising a computer comprising at least one processor, one or more memories, one or more computer readable storage media having program instructions executable by the computer to perform the program instructions comprising:

collecting, by the computer, failure data from a set of failed nodes of the plurality of nodes, wherein the failure data includes information regarding usage and conditions of each given failed node of the set of failed nodes(s) prior to a failure point of the given failed node comprising static data regarding failure of each given failed node and dynamic data;

identifying, by the computer, a failure pattern of the node based on the failure data;

monitoring, by the computer, the plurality of nodes for the failure pattern to determine that a first node of the plurality of nodes is exhibiting the failure pattern; and capturing, by the computer, in response to the determination that the first node is exhibiting the failure pattern, a snapshot of a virtual machine corresponding to the first node.

14. The computer system of claim 13, wherein the failure data consists of: workload of the virtual machine in the node, workload of a server hosting the virtual machines of the node, software installations and updates, and software version.

15. The computer system of claim 13, wherein the failure pattern comprises: a combination of repetitive node properties shown prior to the failure point, and a combination of repetitive node properties shown at the failure point.

16. The computer system of claim 13, the static data consists of: operating system installed, libraries, disks attached, and resources allocated.

17. The computer system of claim 13, wherein the dynamic data consists of: current workload information, current usage statistics, and program installations.

* * * * *